United States Patent
Casallas Suarez et al.

(10) Patent No.: US 11,915,362 B2
(45) Date of Patent: Feb. 27, 2024

(54) UV MAPPING ON 3D OBJECTS WITH THE USE OF ARTIFICIAL INTELLIGENCE

(71) Applicant: AUTODESK, INC., San Francisco, CA (US)

(72) Inventors: Juan Sebastian Casallas Suarez, San Leandro, CA (US); Sacha Lepretre, Vercheres (CA); Salvatore Giuliano Vivona, Bolton (CA); Joseph David MacDonald, Montreal (CA); Bryan Villeneuve, Boucherville (CA); Viral Bankimbhai Thakar, Brampton (CA); Bruno Roy, Longueuil (CA); Hervé Michel Lange, Montreal (CA); Fatemeh Teimury, Montreal (CA)

(73) Assignee: AUTODESK, INC., San Francisco, CA (US)

( * ) Notice: Subject to any disclaimer, the term of this patent is extended or adjusted under 35 U.S.C. 154(b) by 727 days.

(21) Appl. No.: 17/000,856

(22) Filed: Aug. 24, 2020

(65) Prior Publication Data

US 2022/0058859 A1    Feb. 24, 2022

(51) Int. Cl.
*G06T 17/10* (2006.01)
*G06F 18/214* (2023.01)
*G06N 20/00* (2019.01)
*G06T 15/04* (2011.01)
*G06T 15/20* (2011.01)
*G06T 19/00* (2011.01)

(52) U.S. Cl.
CPC .......... *G06T 15/205* (2013.01); *G06F 18/214* (2023.01); *G06N 20/00* (2019.01); *G06T 15/04* (2013.01); *G06T 17/10* (2013.01); *G06T 19/00* (2013.01); *G06T 2210/21* (2013.01)

(58) Field of Classification Search
None
See application file for complete search history.

(56) References Cited

U.S. PATENT DOCUMENTS

| 10,489,683 | B1 | 11/2019 | Koh et al. |
| 2014/0033362 | A1 | 1/2014 | Niblett |
| 2019/0012578 | A1 | 1/2019 | Bhagavatula et al. |

FOREIGN PATENT DOCUMENTS

| JP | 2022-513272 A | 2/2022 |
| JP | 7067709 B1 | 5/2022 |
| KR | 10-1966732 B1 | 4/2019 |

OTHER PUBLICATIONS

Grilli et al., Classification of 3D Digital Heritage, Feb. 2019, Remote Sensing, vol. 11, pp. 1-23, https://www.mdpi.com/2072-4292/11/7/847 (Year: 2019).*

(Continued)

*Primary Examiner* — Joni Hsu
(74) *Attorney, Agent, or Firm* — Artegis Law Group, LLP

(57) ABSTRACT

Various embodiments set forth systems and techniques for generating seams for a 3D model. The techniques include generating, based on the 3D model, one or more inputs for one or more trained machine learning models; providing the one or more inputs to the one or more trained machine learning models; receiving, from the one or more trained machine learning models, seam prediction data generated based on the one or more inputs; and placing one or more predicted seams on the 3D model based on the seam prediction data.

20 Claims, 7 Drawing Sheets

(56) References Cited

OTHER PUBLICATIONS

Chollet, F. (2018), Deep Learning with Python. Chapter 1. Manning Publications Co., 38 pages.
Ronneger et al., (2015). U-Net: Convolutional Networks for Biomedical Image Segmentation. In: Navab, N., Hornegger, J., Wells, W., Frangi, A. (eds) Medical Image Computing and Computer-Assisted Intervention—MICCAI 2015. MICCAI 2015. Lecture Notes in Computer Science( ), vol. 9351. Springer, Cham. https://doi.org/10.1007/978-3-319-24574-4_28., 8 pages.
Isola et al., Proceedings of the IEEE Conference on Computer Vision and Pattern Recognition (CVPR), 2017, pp. 1125-1134, 10 pages.
Wang et al., 2019. Dynamic Graph CNN for Learning on Point Clouds. ACM Trans. Graph. 38, 5, Article 146 (Oct. 2019), 12 pages. https://doi.org/10.1145/3326362, 12 pages.
Extended European Search Report for Application No. 21192463.4 dated Mar. 2, 2022, 13 pages.
Bruno et al., "What You Seam is What You Get: Automatic and Interactive UV unwrapping", Retrieved from https://hal.inria.fr/inria-00600243, Jun. 1, 2009, pp. 1-9.
Li et al., "OptCuts: Joint Optimization of Surface Cuts and Parameterization", ACM Transactions on Graphics, vol. 37, No. 6, Article 247, https://doi.org/10.1145/3272127.3275042, Nov. 2018, pp. 247:1-247:13.
Pan et al., "Automatic Re-topology and UV Remapping for 3D Scanned Objects based on Neural Network", https://doi.org/10.1145/3205326.3205356, May 21-23, 2018, 5 pages.
Kalogerakis et al., "3D Shape Segmentation with Projective Convolutional Networks", 2017 IEEE Conference on Computer Vision and Pattern Recognition, DOI 10.1109/CVPR.2017.702, Jul. 21, 2017, pp. 6630-6639.
Li et al., "Cross-Atlas Convolution for Parameterization Invariant Learning on Textured Mesh Surface", 2019 IEEE/CVF Conference on Computer Vision and Pattern Recognition (CVPR), DOI:10.1109/CVPR.2019.00630, Jun. 15, 2019, pp. 6136-6145.

* cited by examiner

UV MAPPING ON 3D OBJECTS WITH THE USE OF ARTIFICIAL INTELLIGENCE

BACKGROUND

Field of the Various Embodiments

Embodiments of the present invention relate generally to computer graphics and, more specifically, to UV mapping on 3D objects with the use of artificial intelligence.

Description of the Related Art

Three-dimensional (3D) graphics applications enable users to design and generate 3D models for various applications, including video games, special effects, design visualization, and printing physical articles based on the 3D model. 3D models are often textured using one or more 2D images via a UV mapping process. The UV mapping process typically involves defining a set of seams where the 3D model should be split, or divided, into one or more parts. The one or more parts are unwrapped or flattened into a single 2D image (two-dimensional UV space) so that a texture can be drawn on the 2D image. In such a manner, the texture on the 2D image is applied or "mapped" to the 3D model.

In UV mapping, the improper placement of seams on the 3D model can cause several problems. In particular, if too many seams, too few seams, or incorrectly placed seams are defined for a given 3D model, then the resulting 2D texture image can include several problems. As described in detail below, these problems include layout inefficiency, distortion, visual artifacts, and seams that are not located at semantic boundaries.

With respect to layout inefficiency, when the 3D model is flattened, the flattened pieces are arranged in a single 2D image. The size and shape of each flattened piece affect how the flattened pieces are laid out on the 2D image. Depending on the arrangement, some amount of blank space will remain around the flattened pieces arranged on the 2D image. However, a large amount of blank space and, thus, the non-optimal use of the space on the 2D image, is undesirable. In particular, the larger the 2D image, the more computer storage space is utilized to store the 2D image, the more network bandwidth is utilized to transmit the 2D image, and the more memory is utilized when a computing device is rendering the 3D model with the texture. Thus, an efficient layout that minimizes blank spaces in the 2D image would be more desirable.

With respect to distortion, when the texture on the 2D image is applied to the 3D model, the 2D image may be stretched or compressed. For example, if placing an image of the world map on a sphere, a single rectangular piece would result in the image stretching along the equator and compressing along the poles. Adding more seams, resulting in more pieces, reduces the amount of distortion when applying the 2D image. However, using many additional pieces influences the layout efficiency of the 2D image and is, therefore, often not an optimal solution to reducing the distortion. Referring to the sphere example, dividing the 3D model into a single rectangular piece would result in less blank space in the 2D image compared to dividing the 3D model into several non-rectangular pieces.

With respect to visual artifacts, when the texture on the 2D image is applied to the 3D model, there may be visual artifacts or visual discontinuity around where the seams are located. Therefore, placing seams in visually noticeable areas is undesirable. For example, when the image of the world map is placed on the sphere, there may be a line, distortion, or other visual artifacts where the edges of the 2D image are joined back together. Adding additional seams to reduce distortion would increase the number of places where such visual artifacts would be noticeable.

Additionally, the seams divide the 3D model into one or more flattened pieces. Placing seams such that they divide the 3D model into logical parts, i.e. along semantic boundaries, enables artists to identify and edit textures for different parts of the model. For example, for the model of the human, dividing the model into pieces corresponding to the arms, legs, head, and torso would allow an artist to identify and edit textures for each part of the body. However, incorrect or undesirable seam placements may result in the 3D model getting divided into too many pieces, into pieces that have more than one logical semantic correspondence, or into pieces that do not have a logical semantic correspondence with the 3D model. Referring to the human model example, although dividing the model into additional pieces may result in less distortion, the additional pieces may not semantically correspond to the underlying 3D model of the human body. Consequently, an artist would have difficulty determining which parts of the body should go on which pieces, or at what location on each piece and with what orientation the body parts should be drawn.

As the foregoing illustrates, what is needed in the art are more effective and robust techniques for generating UV mapping seams for 3D models.

SUMMARY

One embodiment of the present application sets forth a computer-implemented method for generating a set of seam predictions for a three-dimensional (3D) model. The method includes generating, based on the 3D model, one or more representations of the 3D model as inputs for one or more trained machine learning models; generating a set of seam predictions associated with the 3D model by applying the one or more trained machine learning models to the one or more representations of the 3D model, wherein each seam prediction included in the set of seam predictions identifies a different seam along which the 3D model can be cut; and placing one or more seams on the 3D model based on the set of seam predictions.

At least one advantage of the disclosed techniques compared to prior approaches is that, unlike prior approaches, the computer system automatically generates seams for a 3D model that account for semantic boundaries and seam location while minimizing distortion and reducing the number of pieces required to preserve the semantic boundaries. In addition, the use of trained machine learning models allows the computer system to generate seams based on learned best practices, i.e. based on unobservable criteria extracted during the machine learning model training process.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
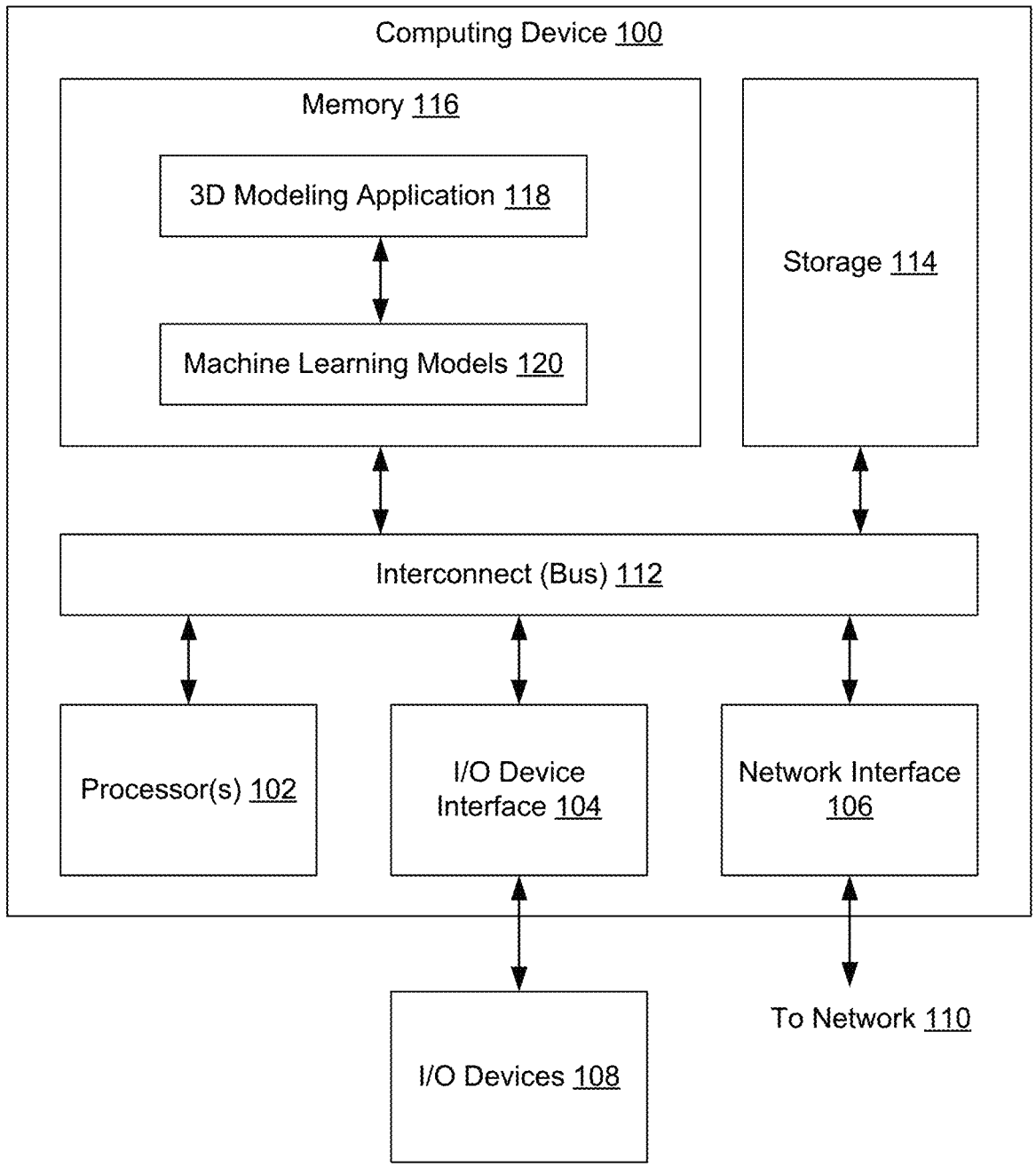
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106 connected to a network 110.

Computing device 100 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing embodiment executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. 3D modeling application 118 and machine learning models 120 may be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processing unit(s) 102 and application data associated with said software programs, including 3D modeling application 118 and machine learning models 120. 3D modeling application 118 and machine learning models 120 are described in further detail below with respect to FIG. 2.

Figure 2:
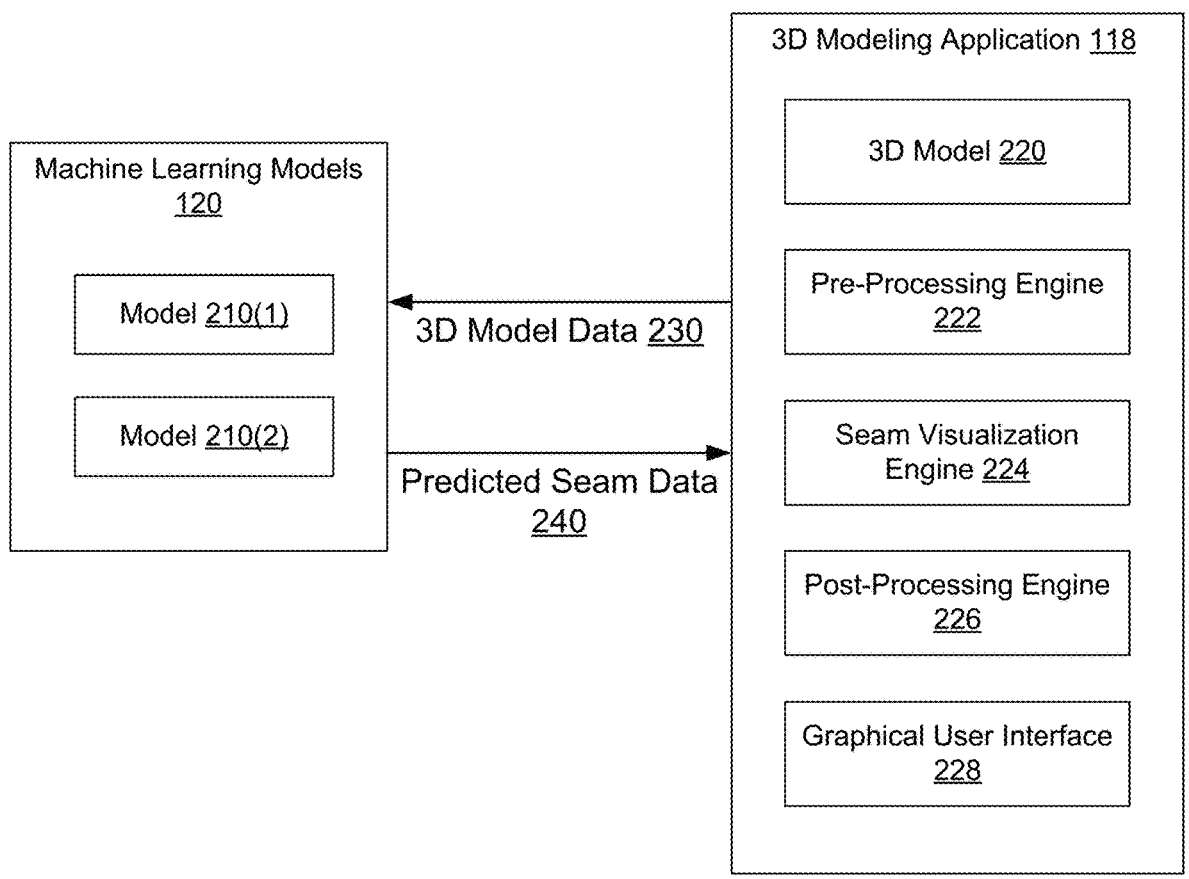
FIG. 2 is a more detailed illustrating of the 3D modeling application and machine learning models of FIG. 1, according to various embodiments of the present disclosure.

FIG. 2 is a more detailed illustration of 3D modeling application 118 and machine learning models 120 of FIG. 1, according to various embodiments of the present disclosure. As shown, 3D modeling application 118 includes, without limitation, 3D model 220, pre-processing engine 222, seam visualization engine 224, post-processing engine 226, and graphical user interface 228.

3D modeling application 118 automatically generates a set of one or more predicted seams for a 3D model 220 using one or more models of the machine learning models 120. Each predicted seam indicates a possible seam along which the 3D model 220 can be cut and flattened. In some embodiments, 3D modeling application 118 also includes tools and features for generating or modifying 3D models, such as 3D model 220. In other embodiments, 3D modeling application 118 may be a separate application or tool from an application that is used to generate or modify 3D model 220, and may receive the 3D model 220 for generating the predicted seams.

In operation, pre-processing engine 222 generates 3D model data 230 based on the 3D model 220 and provides the 3D model data 230 as input data to machine learning models 120. In some embodiments, the 3D model data 230 includes one or more representations of 3D model 220.

In one or more embodiments, pre-processing engine 222 generates 3D model data 230 by rendering a set of 2D images based on the 3D model 220. Each 2D image of the set of 2D images depicts a different point of view of the 3D model 220. The different points of view of the 3D model may be any combination of different zoom levels, viewing angles, viewing positions, 3D model poses, and/or spatial deformations of the 3D model. Additionally, each 2D image may correspond to a different type of information related to the 3D model 220 for the portion of the 3D model 220 visible in the depicted point of view. The different types of 3D model information may be, for example, normal vectors, 3D position, wireframe, Gaussian curvature, shape index, curvedness, sphericity ratios, or any other types of intrinsic measure of the model geometry.

A 2D image corresponding to normal vector information represents, in red-green-blue (RGB) values, the normal vector of each vertex of the 3D model 220 visible from the point of view of the 2D image. Positions on the 3D model that are between vertices are interpolated in the 2D image. A 2D image corresponding to 3D position information represents, in RGB values, the 3D position of each pixel rendered of the 3D model from the point of view of the 2D image. A 2D image corresponding to wireframe information represents, in grayscale values, lines corresponding to the edges of the 3D model 220 visible from the point of view of the 2D image. A 2D image corresponding to principal curvature represents, in hue-saturation-value (HSV) values, extrema (i.e., local minimum and maximum) bending of the surface of the 3D model at each point. Additionally, gaussian curvature, shape index, curvedness, and sphericity ratio may be derived from principal curvature values. A 2D image corresponding to Gaussian curvature information represents, in hue-saturation-value (HSV) values, the likelihood of being mapped to a plane while minimizing distortion. A 2D image corresponding to shape index information represents, in HSV values, five unique families of local curvature. A 2D image corresponding to curvedness information represents, in HSV values, pure local curvature based on weighted neighborhood. A 2D image corresponding to sphericity ratio information represents, in HSV values, how close local curvature is from a sphere.

In one or more embodiments, pre-processing engine 222 generates 3D model data 230 by generating a graph representation of the 3D model 220. The graph representation comprises a set of vertices corresponding to vertices of the 3D model 220 and a set of edges corresponding to the edges of the 3D model 220. In some embodiments, each vertex of the graph representation includes additional information related to the corresponding vertex of the 3D model 220, such as the normal vector for the corresponding vertex, 3D position information for the corresponding vertex, and the likelihood of the corresponding vertex being mapped to a plane while minimizing distortion.

In some embodiments, pre-processing engine 222 divides the 3D model 220 into a plurality of groups. Each group does not occlude or intersect with other groups in the plurality of groups. For example, a 3D model of a car may be separated into a first group that includes the wheels of the car and a second group that includes the body of the car. Pre-processing engine 222 generates respective 3D model data 230 for each group of the plurality of groups using any of the techniques discussed above.

In an embodiment, pre-processing engine 222 divides the 3D model 220 into a plurality of groups by separating the 3D model 220 into a set c of connected components. A connected component may comprise a set of vertices and edges of 3D model 220 that are connected to one another. For example, for a 3D model of a car, the edges and vertices that form the right front wheel of the car would be connected to one another, but would not be connected to the edges and vertices that form the left front wheel of the car or the edges and vertices that form the body of the car. Pre-processing engine 222 may divide the 3D model of the car into five connected components: the right front wheel, the left front wheel, the right rear wheel, the left rear wheel, and the body of the car.

For each connected component $c[i]$ in the set c, the pre-processing engine 222 adds the component to a new group, G. For each remaining component $c[j]$ in the set c, pre-processing engine 222 determines whether $c[i]$ and $c[j]$ intersect and whether $c[i]$ and $c[j]$ occlude one another. If $c[i]$ and $c[j]$ do not intersect and do not occlude one another, pre-processing engine 222 adds the component $c[j]$ to the group G and removes the component $c[j]$ from the set c. This process is repeated for each remaining component in set c until the set is empty.

Machine learning models 120 receive 3D model data 230 from 3D modeling application 118 and generate, based on the 3D model data 230, predicted seam data 240 indicating one or more predicted seams for the 3D model 220. If the 3D model data 230 corresponds to a particular portion of the 3D model 220 and/or to a particular point of view of the 3D model 220, then the predicted seams generated by machine learning models 120 correspond to the particular portion of the 3D model 220 and/or to the particular point of view of the 3D model 220.

Machine learning models 120 include one or more trained machine learning models, such as model 210(1) and model 210(2). Although two machine learning models are illustrated in FIG. 2, machine learning models 120 may include any number of machine learning models. Each machine learning model of machine learning models 120 may be any technically feasible machine learning model. In some embodiments, machine learning models 120 include recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In other embodiments, machine learning models 120 include functionality to perform clustering, principal component analysis (PCA), latent semantic analysis (LSA), Word2vec, and/or another unsupervised, semi-supervised, reinforcement, or self-supervised learning technique. In some embodiments, machine learning models 120 include neural networks (shallow or deep), regression models, support vector machines, decision trees, random forests, gradient boosted trees, naïve Bayes classifiers, Bayesian networks, hierarchical models, and/or ensemble models.

In some embodiments, machine learning models 120 includes a trained machine learning model that is trained to receive a 2D image of a 3D model and generate data indicating the predicted seams on the 2D image. For example, the data may indicate which pixels of the 2D image correspond to a predicted seam.

In some embodiments, machine learning models 120 includes a trained machine learning model that is trained to receive a graph representation corresponding to a 3D model and generate data indicating which vertices and/or edges of the graph representation correspond to a predicted seam.

In some embodiments, machine learning models 120 includes a trained machine learning model that is trained to receive a volumetric representation corresponding to a 3D model and generate data indicating which voxels of the volumetric representation correspond to a predicted seam.

In some embodiments, machine learning models 120 includes a trained machine learning model that is trained to receive point cloud data of a 3D model and generate data indicating which points in the point cloud representation correspond to a predicted seam.

In some embodiments, machine learning models 120 includes a trained machine learning model that is trained to receive a parametric representation corresponding to a 3D model and generate data indicating which parameter values in the parametric representation correspond to a predicted seam.

Additionally, in some embodiments, machine learning models 120 includes one or more trained machine learning models that receive model data that includes an initial set of predicted seams and generates a refined or adjusted set of predicted seams, for example, by removing predicted seams that do not satisfy a threshold probability value, reducing predicted seams to a specified thickness, connecting two or more predicted seams to fill a gap, smoothing predicted seams, removing isolated vertices, or adjusting predicted seams based on model symmetry.

In some embodiments, the output data generated by machine learning models 120 includes probability values associated with the predicted seams. The probability value may indicate the likelihood that a pixel, vertex, edge, voxel, or point corresponds to a seam for 3D model 220. For example, a probability value of 0 may be associated with a pixel, vertex, or edge to indicate that the pixel, vertex, edge, voxel, or point is not likely to correspond to a seam, and a probability value of 1 may be associated with a pixel, vertex, edge, voxel, or point to indicate that the pixel, vertex, edge, voxel, or point is likely to correspond to a seam. In some embodiments, the probability values may be one of two binary values, e.g. indicate seam or not a seam. In some embodiments, the probability values may be a range of values, e.g. to indicate a percentage likelihood.

The models of machine learning models 120 may be trained to receive different types of input data, generate different types of output data, and/or may be trained with different model and training hyperparameters and weights. As an example, model 210(1) may be trained to receive a 2D image depicting a view of a 3D model and generate output indicating predicted seams for the view of the 3D model depicted in the 2D image. Model 210(2) may be trained to receive graph data corresponding to a 3D model and generate output indicating which edges of the graph are predicted to correspond to a seam. As another example, model 210(1) may be trained to receive model data corresponding to a 3D model and generate output indicating predicted seams, while model 210(2) may be trained to receive predicted seam data corresponding to one or more predicted seams for the 3D model and generate output indicating one or more refined predicted seams for the 3D model. In some embodiments, one or more models of machine learning models 120 are selected based on the type of input received from 3D modeling application 118.

In some embodiments, the models of machine learning models 120 are trained using different sets of training data. Each set of training data may correspond to a different style of 3D model, such as organic, man-made, humans, cars, animals, or other categories or model types. One or more models of machine learning models 120 may be selected based on the style of the 3D model 220.

In some embodiments, one or more models of machine learning models 120 are trained using training data provided by a user. For example, user may provide a training set of 3D models that the user has previously created and has defined seams for. The one or more models are therefore trained to generate predicted seams based on preferences and other criteria learned from the user's prior work. The one or more models of machine learning models 120 may be selected based on the user using the 3D modeling application 118.

In some embodiments, a plurality of models of machine learning models 120 receive the same input provided by 3D modeling application 118. Machine learning models 120 may therefore generate multiple sets of predicted seams based on a single input.

Seam visualization engine 224 receives predicted seam data 240 generated by machine learning models 120 and processes the predicted seam data 240. In some embodiments, processing the predicted seam data 240 includes aggregating or combining multiple sets of predicted seam data. In some embodiments, multiple sets of predicted seam data correspond to the same portion of 3D model 220 or to the same point of view of 3D model 220. For example, multiple inputs provided to machine learning models 120 may correspond to the same point of view of 3D model 220 but include different information related to 3D model 220. A respective set of predicted seam data may be generated based on each input. As another example, machine learning models 120 may generate multiple sets of predicted seam data for each input provided by 3D modeling application 118. Seam visualization engine 224 aggregates the multiple sets of predicted seam data to generate a single set of predicted seams for the portion of 3D model 220 or for 3D model 220 at that point of view. In one or more embodiments, seam visualization engine 224 aggregates the multiple sets of predicted seam data by identifying predicted seams that are the same or within a threshold distance of one another between the multiple sets of predicted seam data, or removing predicted seams that are not in a threshold number of sets of predicted seam data.

In some embodiments, multiple sets of predicted seam data correspond to different portions of 3D model 220 or to different points of view of 3D model 220. Seam visualization engine 224 combines the multiple sets of predicted seam data. In one or more embodiments, combining the multiple sets of predicted seam data includes identifying and merging predicted seams that overlap or connect between the multiple sets of predicted seam data to generate a single set of predicted seams for 3D model 220. After generating the single set of predicted seams, the predicted seams are placed on 3D model 220. In one or more embodiments, combining the multiple sets of predicted seam data includes, for each set of predicted seam data, placing one or more predicted seams on 3D model 220 based on the set of predicted seam data. Seam visualization engine 224 may place predicted seams on 3D model 220 in a manner similar to that discussed below. After the predicted seams from the multiple sets of predicted seam data are placed on 3D model 220, 3D model 220 includes a single set of predicted seams.

In some embodiments, processing the predicted seam data 240 includes placing one or more predicted seams on 3D model 220 based on the predicted seam data 240. In some embodiments, the predicted seam data 240 indicates locations on 3D model 220 where seams may be placed. Seam visualization engine 224 places one or more predicted seams onto 3D model 220 based on the locations indicated by the predicted seam data 240. In some embodiments, the predicted seam data 240 indicates one or more edges and/or one or more vertices of 3D model 220 that are predicted to correspond to a seam. Seam visualization engine 224 places one or more predicted seams onto 3D model 220 based on the one or more edges and/or one or more vertices.

In some embodiments, each edge and/or vertex of 3D model 220 is associated with a probability value indicating a likelihood that the edge or vertex is corresponds to a seam. Placing one or more predicted seams onto 3D model 220 includes updating the probability value of one or more edges and/or one or more vertices of 3D model 220 based on the predicted seam data 240.

In some embodiments, the predicted seam data 240 includes respective probability values associated with each vertex of a graph representation of 3D model 220. Placing one or more predicted seams onto 3D model 220 includes, for each vertex of the graph representation, determining a corresponding vertex of 3D model 220 and updating the probability value of the corresponding vertex of 3D model 220 based on the probability value associated with the vertex of the graph representation.

In some embodiments, the predicted seam data 240 includes respective probability values associated with each edge of a graph representation of 3D model 220. Placing one or more predicted seams onto 3D model 220 includes, for each edge of the graph representation, determining a corresponding edge of 3D model 220 and updating the probability value of the corresponding edge of 3D model 220 based on the probability value associated with the edge of the graph representation.

In some embodiments, the predicted seam data 240 includes a plurality of 2D images depicting 3D model 220, and indicates, for each 2D image of the plurality of 2D images, predicted seams on the 2D image. Seam visualization engine 224 projects the predicted seams onto 3D model 220 based on the predicted seams indicated in the plurality of 2D images.

In some embodiments, to project predicted seams onto 3D model 220, seam visualization engine 224 assigns a probability value of $q[w]=0$ to each vertex w of the 3D model 220. In some embodiments, each 2D image corresponds to a point of view v of the 3D model 220, captured by a camera position k[v], and each pixel [i,j] of the image represents the probability that the pixel corresponds to a seam on 3D model 220 (e.g. probability $p[i,j]=0$ does not correspond to a seam and $p[i,j]=1$ corresponds to a seam).

For each pixel [i,j], seam visualization engine 224 calculates a vector that originates at the camera position k[v] and passes through the pixel. Seam visualization engine 224 then calculates the intersection t,n, if any, between the vector and the 3D model 220, where t represents the position of the intersection and n represents the normal of the intersection.

If an intersection exists between the vector and the 3D model 220, then seam visualization engine 224 determines the closest vertex w of 3D model 220 to the intersection, and updates the probability value q[w] of the vertex to the average of probability p[i,j] and q[w]. In some embodiments, seam visualization engine 224 weighs the probability value q[w] by the intersection normal n and the intersection distance $|t-k[v]|$. After probability values for the vertices of 3D model 220 have been updated based on the plurality of 2D images, seam visualization engine 224 assigns each edge [wi, wj] of the 3D model a probability value based on the probability value associated with the vertices of the edge, e.g. p[wi] and p[wj]. In one embodiment, the probability value assigned to the edge is the greater of the probability value assigned to the vertices of the edge.

Once the predicted seams have been placed onto the 3D model, post-processing engine 226 refines or adjusts the predicted seams, such as by removing predicted seams that do not satisfy a threshold probability value, reducing predicted seams to a specified thickness, connecting two or more predicted seams to fill a gap, smoothing predicted seams, removing isolated vertices, and adjusting predicted seams based on model symmetry.

In some embodiments, to remove predicted seams that do not satisfy a threshold probability value, post-processing engine 226 determines whether a vertex or edge of 3D model 220 is associated with a probability value that is below the threshold probability value. If the vertex or edge is associated with a probability value that is below the threshold probability value, post-processing engine 226 updates the probability value to a value that indicates that the edge or vertex does not correspond to a seam, e.g. a probability value of zero.

In some embodiments, to adjust predicted seams based on model symmetry, post-processing engine 226 analyzes the 3D model 220 to identify vertices that match in bilateral symmetry, e.g. left-hand side and right-hand side are symmetric. For any pair of symmetric vertices, post-processing engine 226 replaces the probability value associated with each vertex with the average of the two probability values.

In some embodiments, to fill in or reduce gaps in the predicted seams, post-processing engine 226 identifies a portion of a predicted seam where the probability values associated with vertices in the portion of the predicted seam are below the threshold probability value. Post-processing engine 226 adjusts the probability values of the vertices in the portion of the predicted seam to the threshold probability value.

In some embodiments, a predicted seam is multiple edges thick, e.g. includes multiple parallel edges of 3D model 220. Post-processing engine 226 adjusts the predicted seam such that it is only a single edge thick. For example, if a predicted seam includes three parallel edges, post-processing engine 226 adjusts the probability values associated with two of the edges to zero to remove the edges from the predicted seam. Additionally, post-processing engine 226 may also remove, from the predicted seam, any edges that connected the remaining edge to the removed edges. In some embodiments, post-processing engine 226 selects an edge that is in the middle of a set of parallel edges as the remaining edge. In other embodiments, post-processing engine 226 selects the edge that is associated with the highest probability values as the remaining edge.

In some embodiments, post-processing engine 226 removes stray or isolated vertices from the set of predicted seams. Post-processing engine 226 identifies vertices whose probability values are greater than the threshold probability value but, if removed, does not affect the topology of connected seams. Post-processing engine 226 adjusts the probability values associated with isolated vertices to zero to remove them from the set of predicted seams.

In some embodiments, to smooth a predicted seam, post-processing engine 226 moves one or more vertices in the predicted seam to neighboring vertices. In some embodiments, post-processing engine 226 moves a vertex to a neighboring vertex if the move reduces the angle between successive edges in the predicted seam. Reducing the angle between edges in the predicted seam changes the seam to a smoother version that still follows close to the original path of the predicted seam.

In some embodiments, post-processing engine 226 uses machine learning models 120 to adjust or refine the predicted seams. Post-processing engine 226 generates 3D model data 230 based on the predicted seams and provides the 3D model data 230 to machine learning models 120. In one embodiment, post-processing engine 226 generates a graph representation of the 3D model 220 that includes a set of predicted seams. Post-processing engine 226 provides the graph representation to machine learning models 120. Machine learning models 120 adjusts and refines the set of predicted seams in the graph representation. For example, each edge of the graph representation may be associated with a probability value indicating the likelihood that the edge is a seam. Machine learning models 120 adjusts or refines the set of predicted seams by adjusting the probability values associated with edges of the graph representation.

Graphical user interface 228 displays the 3D model 220. In some embodiments, graphical user interface 228 includes controls for rotating, zooming in and out, and otherwise viewing the 3D model 220 from different points of view. After the one or more predicted seams are placed on the 3D model 220, graphical user interface 228 is updated to display the 3D model 220 with its predicted seams.

In some embodiments, each predicted seam is associated with a probability value. Graphical user interface 228 displays a visual indication of the probability value associated with each predicted seam. For example, graphical user interface 228 may use a range of colors to correspond to a range of probability values and display each predicted seam using a color corresponding to the probability value associated with the predicted seam. As another example, graphical user interface 228 may display the probability value associated with a predicted seam when a user places a cursor over the predicted seam or selects the predicted seam.

In some embodiments, graphical user interface 228 includes graphical controls that enable users to adjust the one or more predicted seams. In some embodiments, graphical user interface 228 includes tools and controls that allow a user to add a seam to 3D model 220, modify a predicted seam, remove a predicted seam, or merge two or more predicted seams. In some embodiments, after the user has adjusted the one or more predicted seams, the 3D model 220 with the adjusted seams is stored or otherwise provided to machine learning models 120 for training additional machine learning models or refining trained machine learning models.

In some embodiments, graphical user interface 228 includes tools and controls that allow a user to change configuration settings associated with pre-processing engine 222, machine learning models 120, seam visualization engine 224, and/or post-processing engine 226. As an example, graphical user interface 228 may include graphical controls for adjusting the inputs generated by pre-processing engine 222, such as the number of inputs, the type of inputs, the information related to 3D model 220 used when generating the inputs, or whether to divide 3D model 220 into a plurality of groups. As another example, graphical user interface 228 may include graphical controls for selecting a 3D model style from a plurality of 3D model styles. Each 3D model style may correspond to a different machine learning models, such as organic, man-made, humans, cars, animals, or other styles of 3D models used to train the different machine learning models.

In some embodiments, graphical user interface 228 updates the predicted seams displayed on 3D model 220 based on how the changed configuration settings affect the predicted seams. For example, graphical user interface 228 may include controls for specifying or adjusting a threshold probability value. Post-processing engine 226 may hide, discard, or remove predicted seams that are not associated with a probability value higher than the threshold probability value. After the threshold probability value is adjusted using graphical user interface 228, the post-processing engine 226 updates the predicted seams for 3D model 220 based on the adjusted threshold probability value. Graphical user interface 228 updates the display of 3D model 220 with the updated set of predicted seams.

Figure 3:
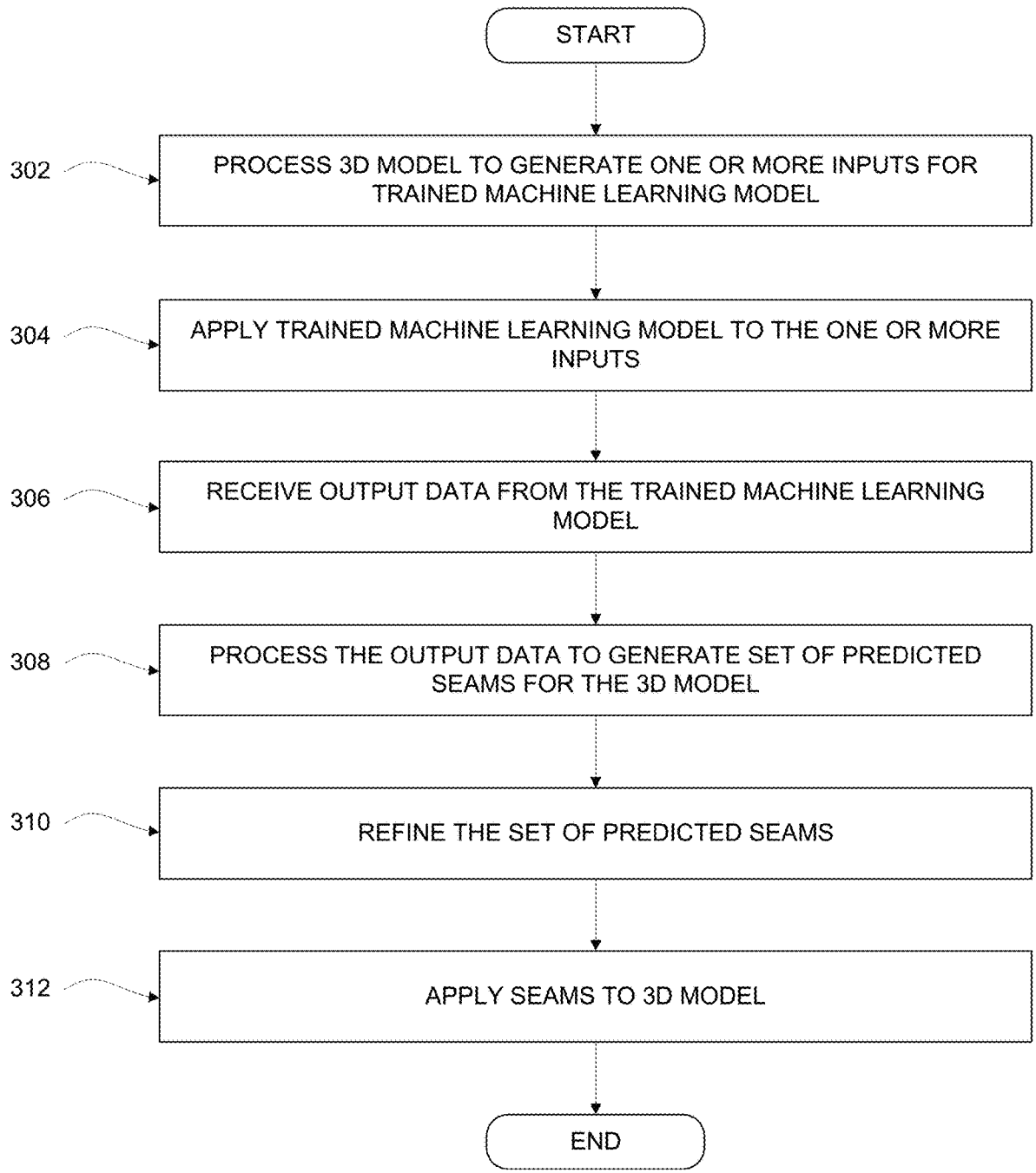
FIG. 3 is a flowchart of method steps for predicted seam generation performed by the 3D modeling application of FIG. 1, according to various embodiments of the present disclosure.

FIG. 3 is a flowchart of method steps for predicted seam generation performed by the 3D modeling application 118 of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 302, pre-processing engine 222 processes a 3D model 220 to generate one or more inputs for machine learning models 120. Generating the one or more inputs is performed in a manner similar to that disclosed above with respect to pre-processing engine 222, and as further described below with regards to FIGS. 4 and 5.

In some embodiments, pre-processing engine 222 generates the one or more inputs by rendering a set of 2D images based on the 3D model 220. Each 2D image of the set of 2D images depicts a different point of view of the 3D model 220. The different points of view of the 3D model may be any combination of different zoom levels, viewing angles, viewing positions, and/or 3D model poses. Additionally, each 2D image may correspond to a different type of information related to the 3D model 220 for the portion of the 3D model 220 visible in the depicted point of view.

In some embodiments, pre-processing engine 222 generates the one or more inputs by generating a graph representation of the 3D model 220. The graph representation comprises a set of nodes corresponding to vertices of the 3D model 220 and a set of edges corresponding to the edges of the 3D model 220. In some embodiments, each node of the graph representation includes additional information related to the corresponding vertex of the 3D model 220, such as the normal vector for the corresponding vertex, 3D position information for the corresponding vertex, and the likelihood of the corresponding vertex being mapped to a plane while minimizing distortion.

In some embodiments, pre-processing engine 222 divides the 3D model 220 into a plurality of groups. Each group does not occlude or intersect with other groups in the plurality of groups. For example, a 3D model of a car may be separated into a first group that includes the wheels of the car and a second group that includes the body of the car. As another example, a 3D model of a human may be separated into a group that includes the head, a group that includes the limbs, and a group that includes the torso. Pre-processing engine 222 generates respective 3D model data 230 for each group of the plurality of groups using any of the techniques discussed above.

In step 304, 3D modeling application 118 applies machine learning models 120 to the one or more inputs. In some embodiments, applying machine learning models 120 includes providing the one or more inputs to one or more models of machine learning models 120. The machine learning models 120 receive the one or more inputs and generate, based on the one or more inputs, output data indicating one or more predicted seams for the 3D model 220. If the 3D model data 230 corresponds to a particular portion of the 3D model 220 and/or to a particular point of view of the 3D model 220, then the predicted seams correspond to the particular portion of the 3D model 220 and/or to the particular point of view of the 3D model 220.

In step 306, 3D modeling application 118 receives output data from machine learning models 120. The output data indicates one or more predicted seams for the 3D model 220, based on the one or more inputs provided to the machine learning models 120 in step 304. In some embodiments, the one or more inputs include a 2D image of the 3D model 220, and the output data received from machine learning models 120 indicate predicted seams on the 2D image. In some embodiments, the one or more inputs include a graph representation corresponding to the 3D model 220, and the output data received from machine learning models 120 indicate which edges of the graph representation correspond to a predicted seam.

In step 308, seam visualization engine 224 processes the output data to generate a set of predicted seams for 3D model 220. Processing the output data is performed in a manner similar to that disclosed above with respect to seam visualization engine 224, and as further described below with regards to FIGS. 4 and 5. In some embodiments, processing the output data includes aggregating or combining multiple sets of output data to generate a combined set of predicted seams for 3D model 220. In some embodiments, processing the output data includes placing one or more seams onto 3D model 220 based on the output data.

In some embodiments, the output data indicates locations on 3D model 220 that are predicted to correspond to seams. Seam visualization engine 224 places one or more predicted seams onto 3D model 220 based on the locations indicated by the output data. For example, the output data may indicate predicted seams on a 2D image depicting 3D model 220, and seam visualization engine 224 projects the predicted seams onto 3D model 220 based on the 2D image. As another example, the output data may indicate one or more edges and/or one or more vertices of 3D model 220 that are predicted to be part of a seam, and seam visualization engine 224 places one or more predicted seams onto 3D model 220 based on the one or more edges and/or one or more vertices.

In step 310, post-processing engine 226 refines the set of predicted seams. Refining the set of predicted seams is performed in a manner similar to that disclosed above with respect to post-processing engine 226, and as further described below with regards to FIGS. 4 and 5. In some embodiments, post-processing engine 226 refines the set of predicted seams by removing predicted seams that do not satisfy a threshold probability value, reducing predicted seams to a specified thickness, connecting two or more predicted seams to fill a gap, smoothing predicted seams, removing isolated vertices, or adjusting predicted seams based on model symmetry.

In some embodiments, post-processing engine 226 refines the set of predicted seams by using machine learning models 120. Post-processing engine 226 generates input data based on the predicted seams and provides the input data to machine learning models 120. As an example, post-processing engine 226 may generate a graph representation of the 3D model 220 that includes a set of predicted seams. Post-processing engine 226 provides the graph representation to machine learning models 120. Machine learning models 120 adjusts and refines the set of predicted seams in the graph representation.

In step 312, 3D modeling application 118 applies the predicted seams to 3D model 220. In some embodiments, 3D modeling application 118 applies the predicted seams in response to receiving user input via graphical user interface 228 accepting the predicted seams.

In some embodiments, applying the predicted seams to 3D model 220 includes splitting the 3D model along the predicted seams and flatting the resulting pieces of 3D model 220 into a 2D texture image. In other embodiments, applying the predicted seams to 3D model 220 includes storing 3D model 220 with the predicted seams and/or providing 3D model 220 with the predicted seams to a different application or tool that performs the 2D texture image generation.

Figure 4:
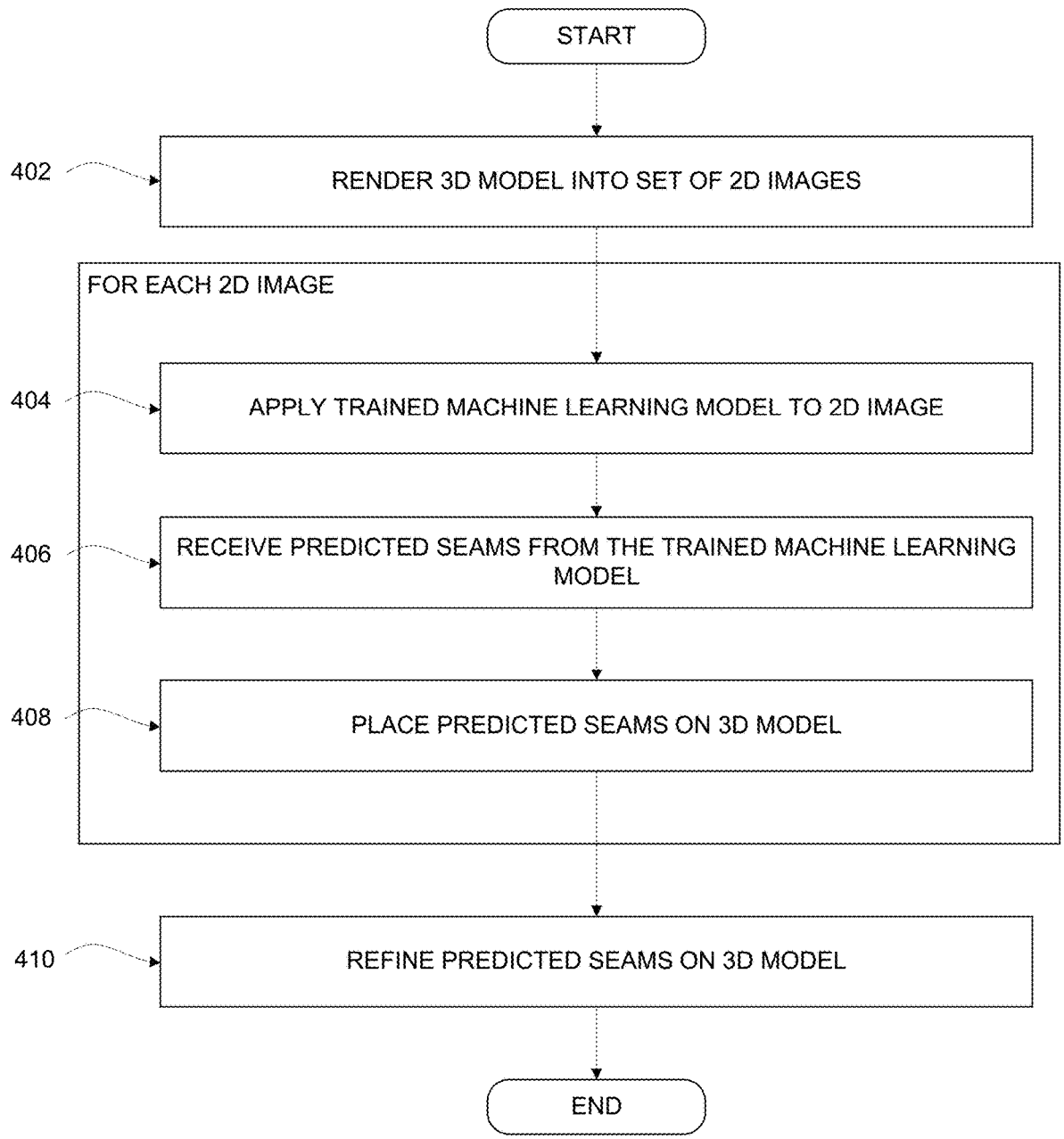
FIG. 4 is a flowchart of method steps for predicted seam generation, using 2D images, performed by the 3D modeling application of FIG. 1, according to various embodiments of the present disclosure.

FIG. 4 is a flowchart of method steps for predicted seam generation, using 2D images, performed by the 3D modeling application of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 402, pre-processing engine 222 renders a 3D model 220 into a set of 2D images. Rendering 3D model 220 into a set of 2D images is performed in a manner similar to that disclosed above with respect to pre-processing engine 222. In some embodiments, each 2D image of the set of 2D images depicts a different point of view of the 3D model 220. The different points of view of the 3D model may be any combination of different zoom levels, viewing angles, viewing positions, and/or 3D model poses. Additionally, each 2D image may correspond to a different type of information related to the 3D model 220 for the portion of the 3D model 220 visible in the depicted point of view. In some embodiments, pre-processing engine 222 divides 3D model 220 into a plurality of non-occluding and non-intersecting groups. Pre-processing engine 222 generates a respective set of 2D images for each group of the plurality of groups.

In step 404, 3D modeling application 118 applies machine learning models 120 to a 2D image of the set of 2D images. In some embodiments, applying machine learning models 120 to the 2D image includes providing the 2D image to one or more models of machine learning models 120. The machine learning models 120 receive the 2D image from 3D modeling application 118 and generate, based on the 2D image, output data indicating predicted seams for 3D model 220 on the 2D image.

In step 406, 3D modeling application 118 receives, from machine learning models 120, the output data indicating predicted seams on the 2D image. For example, the output data may indicate, for each pixel in the 2D image, whether the pixel is predicted to correspond to a seam on 3D model 220.

In step 408, seam visualization engine 224 places the predicted seams on the 3D model 220 based on the 2D image. Placing the predicted seams on the 3D model 220 based on the 2D image is performed in a manner similar to that disclosed above with respect to seam visualization engine 224. In an embodiment, seam visualization engine 224 places the predicted seams on the 3D model by projecting the predicted seams indicated in the 2D image onto 3D model 220. For example, each vertex of 3D model 220 may be associated with a probability value indicating the probability that the vertex is part of a seam. For each pixel of the 2D image, seam visualization engine 224 determines a vertex of 3D model 220 that corresponds to the pixel and updates the probability value associated with the vertex based on a probability value associated with the pixel.

The above steps 404-408 are repeated for each 2D image of the set of 2D images. After the steps 404-408 are performed for the set of 2D images, 3D model 220 includes the predicted seams corresponding to the set of 2D images.

In step 410, post-processing engine 226 refines the predicted seams placed on 3D model 220. Refining the predicted seams is performed in a manner similar to that disclosed above with respect to post-processing engine 226. In some embodiments, post-processing engine 226 refines the predicted seams on 3D model 220, for example, by removing predicted seams that do not satisfy a threshold probability value, reducing predicted seams to a specified thickness, connecting two or more predicted seams to fill a gap, smoothing predicted seams, removing isolated vertices, and adjusting predicted seams based on model symmetry.

In some embodiments, post-processing engine 226 uses machine learning models 120 to adjust or refine the predicted seams. Post-processing engine 226 generates 3D model data 230 based on the predicted seams and provides the 3D model data 230 to machine learning models 120. In one embodiment, post-processing engine 226 generates a graph representation of the 3D model 220 that includes a set of predicted seams. Post-processing engine 226 provides the graph representation to machine learning models 120. Machine learning models 120 adjusts and refines the set of predicted seams in the graph representation. For example, each edge of the graph representation may be associated with a probability value indicating the likelihood that the edge is a seam. Machine learning models 120 adjusts or refines the set of predicted seams by adjusting the probability values associated with edges of the graph representation.

Figure 5:
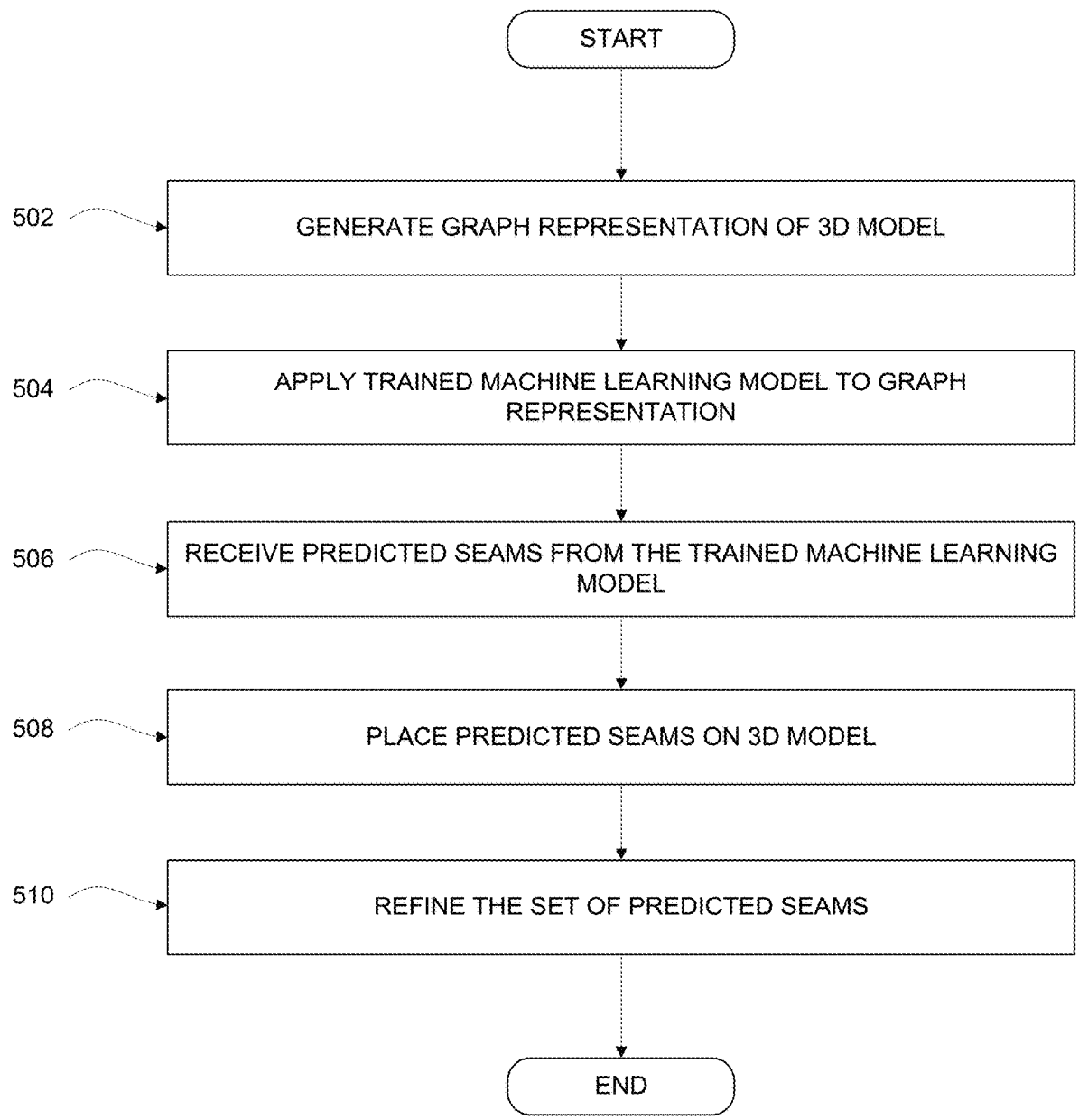
FIG. 5 is a flowchart of method steps for predicted seam generation, using a graph representation, performed by the 3D modeling application of FIG. 1, according to various embodiments of the present disclosure.

FIG. 5 is a flowchart of method steps for predicted seam generation, using a graph representation, performed by the 3D modeling application of FIG. 1, according to various embodiments of the present disclosure. Although the method steps are described in conjunction with the systems of FIGS. 1 and 2, persons skilled in the art will understand that any system configured to perform the method steps in any order falls within the scope of the present disclosure.

In step 502, pre-processing engine 222 processes a 3D model 220 to generate a graph representation of 3D model 220. Generating the graph representation of 3D model 220 is performed in a manner similar to that disclosed above with respect to pre-processing engine 222 In some embodiments, the graph representation comprises a set of vertices corresponding to vertices of the 3D model 220 and a set of edges corresponding to the edges of the 3D model 220. Additionally, in some embodiments, each vertex of the graph representation includes additional information related to the corresponding vertex of the 3D model 220, such as the normal vector for the corresponding vertex, 3D position information for the corresponding vertex, and the likelihood of the corresponding vertex being mapped to a plane while minimizing distortion.

In some embodiments, pre-processing engine 222 divides the 3D model 220 into a plurality of non-occluding and non-intersecting groups. Pre-processing engine 222 generates a respective graph representation for each group of the plurality of groups.

In step 504, 3D modeling application 118 applies machine learning models 120 to the graph representation. In some embodiments, applying machine learning models 120 to the graph representation includes providing the graph representation to one or more models of machine learning models 120. The machine learning models 120 receive the graph representation from 3D modeling application 118 and generate, based on the graph representation, output data indicating predicted seams corresponding to the graph representation. For example, the output data may indicate whether one or more vertices and/or one or more edges of the graph representation are predicted to be part of a seam on 3D model 220.

In step 506, 3D modeling application 118 receives, from machine learning models 120, output data indicating which edges and/or vertices of the graph representation correspond to a seam, or part of a seam, on 3D model 220. For example, the output data may indicate, for each edge or vertex of the graph representation, whether the edge or vertex is predicted to correspond to a seam on 3D model 220.

In step 508, seam visualization engine 224 places one or more predicted seams on 3D model 220 based on the output data. Placing the predicted seams on the 3D model 220 based on the output data is performed in a manner similar to that disclosed above with respect to seam visualization engine 224. In an embodiment, seam visualization engine 224 places one or more predicted seams based on the edges and/or vertices of the graph representation indicated by the output data as corresponding to seams. In some embodiments, each vertex or edge of 3D model 220 may be associated with a probability value indicating the probability that the edge or vertex is part of a seam. Seam visualization engine 224 updates the probability value of each edge or vertex based on a probability value associated with the corresponding edge or vertex in the graph representation.

In step 510, post-processing engine 226 refines predicted seams placed on 3D model 220. Refining the predicted seams is performed in a manner similar to that disclosed above with respect to post-processing engine 226. In some embodiments, post-processing engine 226 refines the predicted seams on 3D model 220, for example, by removing predicted seams that do not satisfy a threshold probability value, reducing predicted seams to a specified thickness, connecting two or more predicted seams to fill a gap, smoothing predicted seams, removing isolated vertices, and adjusting predicted seams based on model symmetry.

In some embodiments, post-processing engine 226 uses machine learning models 120 to adjust or refine the predicted seams. Post-processing engine 226 generates 3D model data 230 based on the predicted seams and provides the 3D model data 230 to machine learning models 120. In one embodiment, post-processing engine 226 generates a graph representation of the 3D model 220 that includes a set of predicted seams. Post-processing engine 226 provides the graph representation to machine learning models 120. Machine learning models 120 adjusts and refines the set of predicted seams in the graph representation. For example, each edge of the graph representation may be associated with a probability value indicating the likelihood that the edge is a seam. Machine learning models 120 adjusts or refines the set of predicted seams by adjusting the probability values associated with edges of the graph representation.

Figure 6:
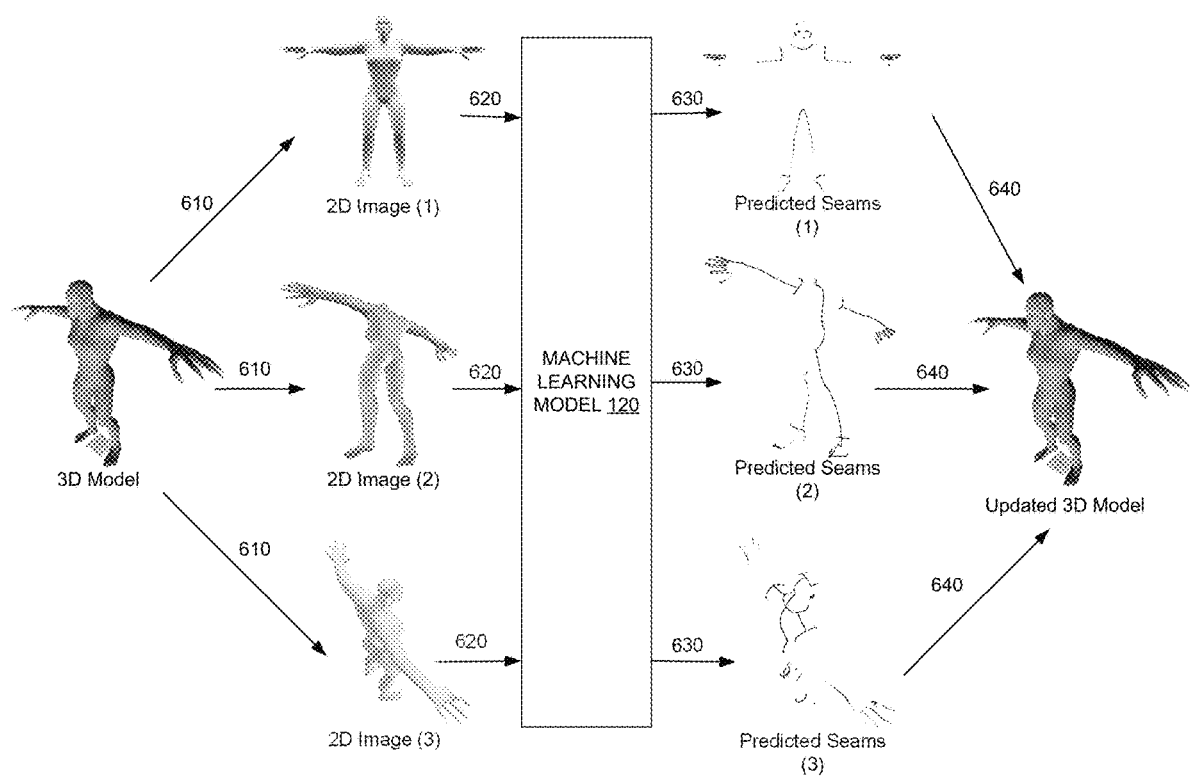
FIG. 6 is an illustration of a predicted seam generation procedure using 2D images, according to various embodiments of the present disclosure.

FIG. 6 is an illustration of a predicted seam generation procedure, according to various embodiments of the present disclosure. In FIG. 6, the 3D model illustrates an example 3D model 220 generated using 3D modeling application 118 or provided to 3D modeling application 118.

In step 610 pre-processing engine 222 generates a set of 2D images based on a 3D model. 2D image (1), 2D image (2), and 2D image (3) illustrate example 2D images rendered from the 3D model by pre-processing engine 222. As shown in FIG. 6, each 2D image depicts a different point of view of the 3D model. Although not shown in the figure, each 2D image may also be based on different information related to the 3D model. Although three 2D images are illustrated in FIG. 6, any number of 2D images may be rendered from a 3D model. In some embodiments, pre-processing engine 222 renders a number of 2D images such that each portion of 3D model is depicted in at least one 2D image.

In step 620, 3D modeling application 118 provides the set of 2D images to machine learning models 120. The machine learning models 120 receive the set of 2D images and generate, for each 2D image of the set of 2D images, one or more predicted seams for the 3D model. Predicted seams (1), predicted seams (2), and predicted seams (3) illustrate examples of predicted seams generated by machine learning models 120, based on 2D image (1), 2D image (2), and 2D image (3), respectively. For example, machine learning models 120 receive 2D image (1) and generate, based on 2D image (1), predicted seams (1) indicating one or more predicted seams for the view of the 3D model depicted in 2D image (1). Although FIG. 6 illustrates a single predicted seam corresponding to each 2D image, machine learning models 120 may generate a plurality of predicted seams for each 2D image provided by 3D modeling application 118.

In step 630, machine learning models 120 provides the set of predicted seams, predicted seams (1), predicted seams (2), and predicted seams (3), to 3D modeling application 118.

In step 640, seam visualization engine 224 places the set of predicted seams onto the 3D model. The updated 3D model illustrates an example of the predicted seams placed on the 3D model by seam visualization engine 224.

Figure 7:
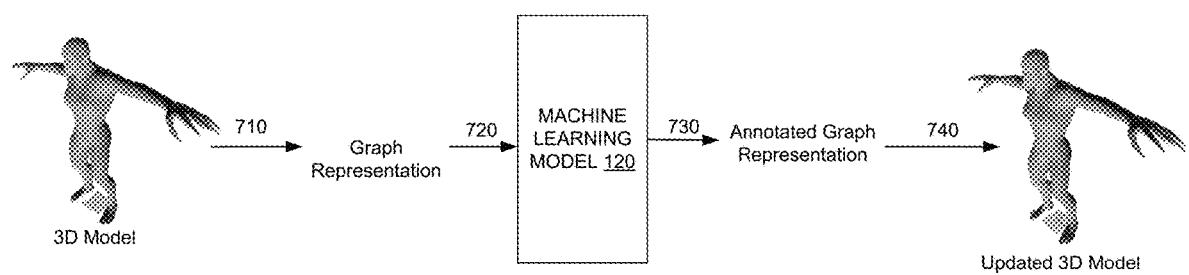
FIG. 7 is an illustration of a predicted seam generation procedure using a graph representation, according to various embodiments of the present disclosure.

FIG. 7 is an illustration of a predicted seam generation procedure, according to various embodiments of the present disclosure. In FIG. 7, the 3D model illustrates an example 3D model 220 generated using 3D modeling application 118 or provided to 3D modeling application 118.

In step 710 pre-processing engine 222 generates a graph representation based on the 3D model.

In step 720, 3D modeling application 118 provides the graph representation to machine learning models 120. The machine learning models 120 receive the graph representation and generate, an annotated graph representation indicating one or more predicted seams for the 3D model. The annotated graph representation includes data indicating, for each vertex and/or edge in the graph representation, whether the vertex and/or edge is predicted to be part of a seam for the 3D model.

In step 730, machine learning models 120 provides the annotated graph representation to 3D modeling application 118.

In step 740, seam visualization engine 224 places one or more predicted seams onto the 3D model based on the annotated graph representation. The updated 3D model illustrates an example of the predicted seams placed on the 3D model by seam visualization engine 224.

As discussed above with respect to graphical user interface 228, graphical user interface displays the 3D model and the updated 3D model. In some embodiments, graphical user interface 228 includes graphical controls that enable users to rotate, zoom, and pan the updated 3D model to view the predicted seams placed on the 3D model. In some embodiments, graphical user interface 228 includes tools and controls that enable users to add seams to the updated 3D model, modify a predicted seam placed on the updated 3D model, remove a predicted seam, or merge two or more predicted seams.

In some embodiments, 3D modeling application 118 evaluates the predicted seams for the 3D model and/or the UV mapping resulting from applying the predicted seams to the 3D model.

In some embodiments, validating or evaluating the predicted seams includes, for example, determining whether applying the UV mapping to the 3D model results in minimal visible distortion; whether the UV mapping is contained within a minimal number of shells in UV space; whether the predicted seams are placed in hidden or less visible locations on the 3D model; or whether the UV mapping is defined within an optimized UV space.

Minimizing the amount of distortion minimizes the amount of compression or stretching that occurs when mapping a texture from a 2D image onto the 3D model. In some embodiments, determining whether applying the UV mapping to the 3D model results in minimal visible distortion may include determining how much compression or stretching occurs when mapping the texture onto the 3D model. Determining whether applying the UV mapping to the 3D model results in minimal visible distortion may also include determining whether the amount of compression or stretching is within a threshold amount.

Minimizing the number of shells may preserve the semantic boundaries of the 3D model. In some embodiments, determining whether the UV mapping is contained within a minimal number of shells in UV space includes determining how many shells result are in the UV mapping when the seams are applied. Determining whether the UV mapping is contained within a minimal number of shells in UV space may also include determining whether the number of shells is within a threshold amount, for example, based on a type of object in the 3D model, an amount indicated by a machine learning model based on the 3D model, or a maximum number of shells indicated by a user.

In some embodiments, determining whether the predicted seams are placed in hidden or less visible locations on the 3D model includes determining whether the predicted seams are visible from one or more camera positions. The one or more camera positions may be based on how the 3D model will be visualized. For example, if the 3D model will be viewed from an overhead perspective, then the one or more camera positions include one or more overhead camera positions.

Defining a UV mapping within an optimized UV space reduces the amount of resources needed to store and process the UV mapping, e.g. computer storage space, computer memory usage, and network bandwidth. In some embodiments, determining whether the UV mapping is defined within an optimized UV space includes determining a size of the UV mapping. Determining whether the UV mapping is defined within an optimized UV space may also include determining whether the size is within a threshold dimension. In some embodiments, determining whether the UV mapping is defined within an optimized UV space includes determining the amount of empty space in the UV mapping compared to the amount of space that corresponds to the 3D model.

In some embodiments, evaluating the predicted seams may include generating one or more validation values associated with the predicted seams. The validation values may indicate, for example, a level of confidence that the set of predicted seams is correct, whether the set of predicted seams satisfy one or more of the criteria discussed above, a likelihood that the predicted seams are plausible seams for the 3D model, how closely the set of predicted seams matches a set of provided seams for the 3D model (e.g. previously created by a user). The one or more validation values may be displayed to the user in the graphical user interface 228. For example, 3D modeling application 118 may generate and display an analysis report that indicates the one or more validation values.

In some embodiments, generating the one or more validation values includes generating a confidence interval associated with the predicted seams. The accuracy of the machine learning models 120 are evaluated based on a set of validation samples. The confidence interval may be generated based on the accuracy of the particular machine learning models of machine learning models 120 that were used to generate the predicted seams. The confidence interval indicates how confident the machine learning model is about a subset of the predicted seams In some embodiments, generating the one or more validation values includes comparing the predicted seams with a set of seams provided for the 3D model. The set of provided seams may be, for example, seams that were previously created by a user or by other machine learning models for the 3D model. One or more validation values are generated based on the comparison, such as difference in distortion, difference in number of shells, true-position rate, false-position rate, or false-negative rate.

In some embodiments, generating the one or more validation values includes providing the predicted seams to one or more trained machine learning models that are trained to receive input indicating a set of predicted seams and generate output indicating an accuracy of the set of predicted seams. The one or more trained machine learning models may be discriminative models for evaluating the results produced by corresponding machine learning models that generated the predicted seams.

In some embodiments, based on evaluating the predicted seams, the 3D model with the predicted seams are stored or otherwise provided to machine learning models 120 for training additional machine learning models or refining trained machine learning models. For example, if the evaluation indicates that the predicted seams do not satisfy the criteria discussed above, the predicted seams may be refined or the 3D model may be provided to one or more users to manually define a set of seams. The 3D model with refined or manually defined seams is provided as training input to the machine learning models 120. One advantage of using evaluation results to retrain machine learning models is that the machine learning models can learn from 3D models that do not conform to the 3D models that were previously used to train the machine learning models, such as 3D models with unusual shapes or that depict new object types.

In sum, the computer system generates a set of seams for a 3D model, which indicate how the 3D model may be unwrapped and flattened into a 2D image for applying textures. The computer system processes the 3D model to generate one or more inputs that are provided to a trained neural network.

The trained neural network is configured to receive the one or more inputs and generate output indicating one or more predicted seams for the 3D model. The computer system further refines the one or more predicted seams to, for example, improve symmetry, straighten seam lines, and reduce distortion. Additionally, the computer system enables a user, via a GUI, to view the one or more predicted seams on the 3D model, modify the parameters for refining the predicted seams, and select a probability threshold indicating which predicted seams to accept.

In one approach, to generate the one or more inputs for the trained neural network, the computer system renders the 3D model into a set of 2D images, where each 2D image depicts the 3D model from a different point of view. The trained neural network receives each 2D image and generates, based on the 2D image, an indication of predicted seams on each 2D image. Based on the location of the predicted seams on a 2D image and the point of view depicted by the 2D image, the computer system places the predicted seams onto the 3D model at the corresponding locations.

In another approach, to generate the one or more inputs for the trained neural network, the computer system generates a graph representation of the 3D model. The graph representation is provided as input to the trained neural network, and the trained neural network generates output indicating whether each edge or vertex of the graph representation is predicted to be a seam or part of a seam. Based on the edges of the 3D model that are predicted to be a seam or part of the seam, the computer system places the predicted seams onto the 3D model at the corresponding edges.

In another approach, a first trained neural network is used to generate a first set of predicted seams. The computer system processes the first set of predicted seams to generate input for a second trained neural network. The second trained neural network is configured to receive the first set of predicted seams and refine the first set of predicted seams to generate a second set of predicted seams, for example, by improving symmetry, straightening seam lines, and reducing distortion. The input provided to the first trained neural network and the second trained neural network may be generated using any of the approaches discussed above. For example, the first set of predicted seams may be generated by providing a set of 2D images of the 3D model to the first trained neural network. After the computer system places the first set of predicted seams onto the 3D model, the computer system generates a graph representation of the 3D model including the first set of predicted seams. The graph representation is provided as input to the second trained neural network.

At least one advantage of the disclosed techniques compared to prior approaches is that, unlike prior approaches, the computer system automatically generates seams for a 3D model that account for semantic boundaries and seam location while minimizing distortion and layout inefficiency. These technical advantages provide one or more technological advancements over prior art approaches.

1. In some embodiments, a method for automatically generating seams for a three-dimensional (3D) model includes: generating, based on the 3D model, one or more representations of the 3D model as inputs for one or more trained machine learning models, generating a set of seam predictions associated with the 3D model by applying the one or more trained machine learning models to the one or more representations of the 3D model, wherein each seam prediction included in the set of seam predictions identifies a different seam along which the 3D model can be cut, and placing one or more seams on the 3D model based on the set of seam predictions.

2. The method of clause 1 further comprising dividing the 3D model into a plurality of groups, and for each group of the plurality of groups, generating respective one or more representations of the 3D model as inputs for the one or more trained machine learning models.

3. The method of any of clauses 1 and 2, wherein the one or more representations of the 3D model include one or more 2D images, wherein the set of seam predictions indicates, for each 2D image of the one or more 2D images, a respective one or more seam predictions in the 2D image.

4. The method of any of clauses 1-3, wherein placing the one or more seams on the 3D model includes, for each 2D image of the one or more 2D images, projecting the respective one or more seam predictions in the 2D image onto the 3D model.

5. The method of any of clauses 1-4, wherein the one or more representations of the 3D model include a graph representation of the 3D model, wherein the set of seam predictions indicates one or more edges of the graph representation that are predicted to be part of a seam.

6. The method of any of clauses 1-5, wherein placing the one or more seams on the 3D model includes for each edge of the one or more edges of the graph representation that are predicted to be part of a seam, determining a corresponding edge of the 3D model, and placing an edge of a seam at the corresponding edge of the 3D model.

7. The method of any of clauses 1-6 wherein the one or more representations of the 3D model include a graph representation of the 3D model, wherein the set of seam predictions indicates one or more vertices of the graph representation that are predicted to be part of a seam.

8. The method of any of clauses 1-7 wherein placing the one or more seams on the 3D model includes for each vertex of the one or more vertices of the graph representation that are predicted to be part of a seam, determining a corresponding vertex of the 3D model, and placing a vertex of a seam at the corresponding vertex of the 3D model.

9. The method of any of clauses 1-8 wherein the 3D model comprises a plurality of edges, wherein each edge is associated with a respective seam probability value indicating a likelihood that the edge corresponds to a seam, wherein placing the one or more seams on the 3D model includes determining one or more edges of the plurality of edges that are associated with the one or more seams, and for each edge of the one or more edges, updating the respective seam probability value associated with the edge.

10. The method of any of clauses 1-9 wherein the 3D model comprises a plurality of vertices, wherein each vertex is associated with a respective seam probability value indicating a likelihood that the vertex corresponds to a seam, wherein placing the one or more seams on the 3D model includes determining one or more vertices of the plurality of vertices that are associated with the one or more seams, and for each vertex of the one or more vertices, updating the respective seam probability value associated with the vertex.

11. The method of any of clauses 1-10 further comprising generating a validation value associated with the set of seam predictions by evaluating at least a subset of seam predictions of the set of seam predictions.

12. The method of any of clauses 1-11 further comprising refining the one or more seams, wherein refining the one or more seams includes one or more of: removing one or more particular seams of the one or more seams, reducing a thickness of one or more particular seams of the one or more seams, connecting two or more particular seams of the one or more seams, smoothing one or more particular seams of the one or more seams, removing one or more seam vertices, adjusting one or more particular seams of the one or more seams based on a symmetry of the 3D model.

13. The method of any of clauses 1-12 further comprising refining the one or more seams, wherein refining the one or more seams includes generating a graph representation of the 3D model based on the one or more seams, generating a set of refined seam predictions associated with the 3D model by applying the one or more trained machine learning models to the graph representation of the 3D model, and updating the one or more seams based on the set of refined seam predictions.

14. In some embodiments, a non-transitory computer-readable medium stores program instructions that, when executed by one or more processors, cause the one or more processors to perform the steps of: generating, based on a three-dimensional (3D) model, one or more representations of the 3D model as inputs for one or more trained machine learning models, generating a set of seam predictions associated with the 3D model by applying the one or more trained machine learning models to the one or more representations of the 3D model, wherein each seam prediction included in the set of seam predictions identifies a different seam along which the 3D model can be cut, and placing one or more seams on the 3D model based on the set of seam predictions.

15. The non-transitory computer-readable medium of clause 14 further including instructions that, when executed by the one or more processors, cause the one or more processors to perform the steps of: dividing the 3D model into a plurality of groups, and for each group of the plurality of groups, generating respective one or more representations of the 3D model as inputs for the one or more trained machine learning models.

16. The non-transitory computer-readable medium of any of clauses 14 and 15, wherein the one or more representations of the 3D model include one or more 2D images, wherein the set of seam predictions indicates, for each 2D image of the one or more 2D images, a respective one or more seam predictions in the 2D image, wherein placing the one or more seams on the 3D model includes, for each 2D image of the one or more 2D images, projecting the respective one or more seam predictions in the 2D image onto the 3D model.

17. The non-transitory computer-readable medium of any of clauses 14-16, wherein the one or more representations of the 3D model include a graph representation of the 3D model, wherein the set of seam predictions indicates one or more edges of the graph representation that are predicted to be part of a seam, wherein placing the one or more seams on the 3D model includes: for each edge of the one or more edges of the graph representation that are predicted to be part of a seam, determining a corresponding edge of the 3D model, and placing an edge of a seam at the corresponding edge of the 3D model.

18. The non-transitory computer-readable medium of any of clauses 14-17, wherein the one or more representations of the 3D model include a graph representation of the 3D model, wherein the set of seam predictions indicates one or more vertices of the graph representation that are predicted to be part of a seam, and wherein placing the one or more seams on the 3D model includes: for each vertex of the one or more vertices of the graph representation that are predicted to be part of a seam, determining a corresponding vertex of the 3D model, and placing a vertex of a seam at the corresponding vertex of the 3D model.

19. The non-transitory computer-readable medium of any of clauses 14-18 further including instructions that, when executed by the one or more processors, cause the one or more processors to perform the steps of: generating a graph representation of the 3D model based on the one or more seams, generating a set of refined seam predictions associated with the 3D model by applying the one or more trained machine learning models to the graph representation of the 3D model, and updating the one or more seams based on the set of refined seam predictions.

20. In some embodiments, a system includes: a memory storing one or more software applications; and a processor that, when executing the one or more software applications, is configured to perform the steps of: generating, based on a three-dimensional (3D) model, one or more representations of the 3D model as inputs for one or more trained machine learning models, generating a set of seam predictions associated with the 3D model by applying the one or more trained machine learning models to the one or more representations of the 3D model, wherein each seam prediction included in the set of seam predictions identifies a different seam along which the 3D model can be cut, and placing one or more seams on the 3D model based on the set of seam predictions.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for automatically generating seams for a three-dimensional (3D) model, the method comprising:
    generating, based on the 3D model, one or more representations of the 3D model that are different from the 3D model as inputs for one or more trained machine learning models;
    generating a set of seam predictions associated with the 3D model by applying the one or more trained machine learning models to the one or more representations of the 3D model, wherein each seam prediction included in the set of seam predictions identifies a different seam along which the 3D model can be cut; and
    placing one or more seams on the 3D model based on the set of seam predictions.

2. The method of claim 1 further comprising:
    dividing the 3D model into a plurality of groups; and
    for each group of the plurality of groups, generating respective one or more representations of the 3D model as inputs for the one or more trained machine learning models.

3. The method of claim 1, wherein the one or more representations of the 3D model include one or more 2D images, wherein the set of seam predictions indicates, for each 2D image of the one or more 2D images, a respective one or more seam predictions in the 2D image.

4. The method of claim 3, wherein placing the one or more seams on the 3D model includes, for each 2D image of the one or more 2D images, projecting the respective one or more seam predictions in the 2D image onto the 3D model.

5. The method of claim 1, wherein the one or more representations of the 3D model include a graph representation of the 3D model, wherein the set of seam predictions indicates one or more edges of the graph representation that are predicted to be part of a seam.

6. The method of claim 5, wherein placing the one or more seams on the 3D model includes:
    for each edge of the one or more edges of the graph representation that are predicted to be part of a seam, determining a corresponding edge of the 3D model; and
    placing an edge of a seam at the corresponding edge of the 3D model.

7. The method of claim 1 wherein the one or more representations of the 3D model include a graph representation of the 3D model, wherein the set of seam predictions indicates one or more vertices of the graph representation that are predicted to be part of a seam.

8. The method of claim 7 wherein placing the one or more seams on the 3D model includes:
for each vertex of the one or more vertices of the graph representation that are predicted to be part of a seam, determining a corresponding vertex of the 3D model; and
placing a vertex of a seam at the corresponding vertex of the 3D model.

9. The method of claim 1 wherein the 3D model comprises a plurality of edges, wherein each edge is associated with a respective seam probability value indicating a likelihood that the edge corresponds to a seam, wherein placing the one or more seams on the 3D model includes:
determining one or more edges of the plurality of edges that are associated with the one or more seams; and
for each edge of the one or more edges, updating the respective seam probability value associated with the edge.

10. The method of claim 1 wherein the 3D model comprises a plurality of vertices, wherein each vertex is associated with a respective seam probability value indicating a likelihood that the vertex corresponds to a seam, wherein placing the one or more seams on the 3D model includes:
determining one or more vertices of the plurality of vertices that are associated with the one or more seams; and
for each vertex of the one or more vertices, updating the respective seam probability value associated with the vertex.

11. The method of claim 1 further comprising generating a validation value associated with the set of seam predictions by evaluating at least a subset of seam predictions of the set of seam predictions.

12. The method of claim 1 further comprising refining the one or more seams, wherein refining the one or more seams includes one or more of: removing one or more particular seams of the one or more seams, reducing a thickness of one or more particular seams of the one or more seams, connecting two or more particular seams of the one or more seams, smoothing one or more particular seams of the one or more seams, removing one or more seam vertices, adjusting one or more particular seams of the one or more seams based on a symmetry of the 3D model.

13. The method of claim 1 further comprising refining the one or more seams, wherein refining the one or more seams includes:
generating a graph representation of the 3D model based on the one or more seams;
generating a set of refined seam predictions associated with the 3D model by applying the one or more trained machine learning models to the graph representation of the 3D model; and
updating the one or more seams based on the set of refined seam predictions.

14. A non-transitory computer-readable medium including instructions that, when executed by one or more processors, cause the one or more processors to perform the steps of:
generating, based on a three-dimensional (3D) model, one or more representations of the 3D model that are different from the 3D model as inputs for one or more trained machine learning models;
generating a set of seam predictions associated with the 3D model by applying the one or more trained machine learning models to the one or more representations of the 3D model, wherein each seam prediction included in the set of seam predictions identifies a different seam along which the 3D model can be cut; and
placing one or more seams on the 3D model based on the set of seam predictions.

15. The non-transitory computer-readable medium of claim 14 further including instructions that, when executed by the one or more processors, cause the one or more processors to perform the steps of:
dividing the 3D model into a plurality of groups; and
for each group of the plurality of groups, generating respective one or more representations of the 3D model as inputs for the one or more trained machine learning models.

16. The non-transitory computer-readable medium of claim 14, wherein the one or more representations of the 3D model include one or more 2D images, wherein the set of seam predictions indicates, for each 2D image of the one or more 2D images, a respective one or more seam predictions in the 2D image, wherein placing the one or more seams on the 3D model includes, for each 2D image of the one or more 2D images, projecting the respective one or more seam predictions in the 2D image onto the 3D model.

17. The non-transitory computer-readable medium of claim 14, wherein the one or more representations of the 3D model include a graph representation of the 3D model, wherein the set of seam predictions indicates one or more edges of the graph representation that are predicted to be part of a seam, wherein placing the one or more seams on the 3D model includes:
for each edge of the one or more edges of the graph representation that are predicted to be part of a seam, determining a corresponding edge of the 3D model; and
placing an edge of a seam at the corresponding edge of the 3D model.

18. The non-transitory computer-readable medium of claim 14, wherein the one or more representations of the 3D model include a graph representation of the 3D model, wherein the set of seam predictions indicates one or more vertices of the graph representation that are predicted to be part of a seam, and wherein placing the one or more seams on the 3D model includes:
for each vertex of the one or more vertices of the graph representation that are predicted to be part of a seam, determining a corresponding vertex of the 3D model; and
placing a vertex of a seam at the corresponding vertex of the 3D model.

19. The non-transitory computer-readable medium of claim 14 further including instructions that, when executed by the one or more processors, cause the one or more processors to perform the steps of:
generating a graph representation of the 3D model based on the one or more seams;
generating a set of refined seam predictions associated with the 3D model by applying the one or more trained machine learning models to the graph representation of the 3D model; and
updating the one or more seams based on the set of refined seam predictions.

20. A system comprising:
a memory storing one or more software applications; and
a processor that, when executing the one or more software applications, is configured to perform the steps of:
generating, based on a three-dimensional (3D) model, one or more representations of the 3D model that are different from the 3D model as inputs for one or more trained machine learning models;

generating a set of seam predictions associated with the 3D model by applying the one or more trained machine learning models to the one or more representations of the 3D model, wherein each seam prediction included in the set of seam predictions identifies a different seam along which the 3D model can be cut; and placing one or more seams on the 3D model based on the set of seam predictions.

* * * * *